United States Patent [19]

En

[11] 4,229,824
[45] Oct. 21, 1980

[54] METHOD AND APPARATUS FOR SYNCHRONIZING ELECTRICAL SIGNALS

[75] Inventor: John En, San Diego, Calif.

[73] Assignee: Cubic Corporation, San Diego, Calif.

[21] Appl. No.: 926,670

[22] Filed: Jul. 21, 1978

[51] Int. Cl.³ ............................................. H04L 25/36
[52] U.S. Cl. .................................... 375/119; 328/155
[58] Field of Search ..................... 328/55, 56, 72, 155, 328/151; 370/232; 178/69.1

[56] References Cited

U.S. PATENT DOCUMENTS

| | | | |
|---|---|---|---|
| 3,544,717 | 12/1970 | Smith | 328/155 X |
| 3,614,635 | 10/1971 | La Pine et al. | 328/155 |
| 3,671,776 | 6/1972 | Houston | 328/72 X |
| 3,755,748 | 8/1973 | Carlow et al. | 328/155 |
| 3,781,706 | 12/1973 | Osborne et al. | 328/155 X |
| 3,908,084 | 9/1975 | Wiley | 178/69.1 |
| 3,980,820 | 9/1976 | Niemi et al. | 178/69.1 |
| 4,019,138 | 4/1977 | Watanabe et al. | 178/69.1 X |
| 4,080,576 | 3/1978 | Huber et al. | 328/155 |

Primary Examiner—John S. Heyman
Attorney, Agent, or Firm—Brown & Martin

[57] ABSTRACT

In the disclosed method and apparatus, a local generator signal is initially generated with a phase that is arbitrary with respect to the input signal. Subsequently, the phase difference between any two successive bits of these signals is measured. Then the phase of the local generator signal is changed in a direction which decreases the measured difference by an amount proportional to the measured difference divided by the total number of phase measurements made. This produces a new local generator signal. These phase measuring and phase changing steps are repeated multiple times, each time using the most recently produced new local generator signal to produce another new local generator signal. By this sequence, the total phase shift from the initially generated local generator signal after N phase shifts are made is identical to the average of the N corresponding phase differences between the initially generated local generator signal and the input signal.

8 Claims, 8 Drawing Figures

METHOD AND APPARATUS FOR SYNCHRONIZING ELECTRICAL SIGNALS

BACKGROUND OF THE INVENTION

This invention relates to methods and apparatus for synchronizing electrical signals together; and more particularly to methods and apparatus for synchronizing an input signal that consists of a plurality of bits which nominally are of one predetermined period but which actually are distorted therefrom, with the local generator signal that consists of a plurality of undistorted bits of the same predetermined period. Such methods and apparatus are useful for example, in communication systems which transmit information to remote stations through the air by radio signals. At the stations, it is necessary for several reasons to synchronize a locally generated signal with the received information signals. For example, externally generated noise operates to distort the bits from their nominal period. That is, the bits which are received typically are either stretched or shrinked from their nominal period. Thus, by synchronizing a locally generated signal that consists of a plurality of non-distorted bits having the same predetermined period, the center of the bits which are received can be determined. Then the information contained therein can be sampled at that point.

Ideally, the phase of the locally generated signal should be generated such that the sum of all phase differences between corresponding bits in it and input signals equals zero. One way to accomplish this is to generate a local generator signal with a phase that is arbitrary with respect to the input signal; to measure the phase differences between it and the input signal for a relative large number of bits; and then to shift this signal by an amount equal to the average of all the measured phase differences. To do this however, requires a relatively large amount of memory. That is, each of the measured phase differences must be stored in order that they can subsequently be averaged; and to get a good average, requires that the number of phase measurements made must be relatively large.

Another problem with the above averaging approach is that the synchronization time is relatively long. This because no phase correction occurs until after a relatively large number of phase measurements have been made, and the average phase difference has been calculated.

Therefore, in the prior art synchronization of electrical signals is performed by other methods and apparatus which are simpler to implement, but which do not produce ideally synchronized signals. For example, typical prior art methods and apparatus operate in a manner wherein the phase difference between some relatively small number (such as 3 or 4) of the most recent bits in the input signal and the local generator signal are used to determine the amount of phase correction to be made. Generally, these signal synchronizers include a capacitor for dynamically storing the last several phase measurements made. This capacitor is slightly charged or discharged with each successive phase measurement. Thus, the capacitor voltage is representative of the phase differences between a relatively small number of bits in the local generator signal and input signal. The capacitor voltage is then utilized to control the amount by which the local generator signal should be shifted in phase to generate a new local generator signal which is more closely synchronized to the input signal.

These prior art devices however, have so called "sensitivity" problems. That is, if the storage time of the capacitor is relatively small then the locally generated signal follows too closely the distortion within the most recently received information bits. Conversely, if the storage time of the capacitor is relatively large, then the locally generated signal is unable to follow or correct for phase changes between it and the input signal. In either case, these devices do not track the input signal based on the average of all prior phase measurements made.

Therefore, it is one object of the invention to provide an improved method of the synchronizing a locally generated signal with a distorted input signal.

Another object of the invention is to provide improved apparatus for synchronizing a locally generated signal with a distorted input signal.

Still another object of the invention is to provide a method and apparatus for generating a signal such that the sum of all phase differences, between it and a distorted input signal are zero.

SUMMARY OF THE INVENTION

These and other objects are accomplished in accordance with the invention by a method and apparatus that operates on an input signal which consists of a plurality of bits that nominally are of one predetermined period but which actually are distorted therefrom. Initially, local generator signal is generated with a phase that arbitrary with respect to the input signal, Subsequently, an initial phase measurement is made; and the local generator signal is shifted in phase by that amount. This produces a new local generator signal. Subsequently, a phase measurement is made using the new local generator signal. This phase measurement is divided by two; and the new local generator signal is shifted by that amount to produce still another new local generator signal. Then another phase measurement is made on the most recently produced new local generator signal. This phase measurement is divided by 3; and the most recently generated new local generator signal is shifted by that amount to produce another new local generator signal. These phase measuring and phase shifting steps are repeated multiple times. Each time the phase of the local generator signal is changed in a direction which decreases the measured phase difference by an amount proportional to the measured phase difference divided by the total number of phase measurements made. The local generator signal which results after N phase measurements and N corresponding phase shifts are made is identical to the initially generated local generator signal but shifted in phase by the average of the N phase measurements.

BRIEF DESCRIPTION OF THE DRAWING

Preferred apparatus and steps for carrying out the disclosed invention will best be understood by referring to following detailed description when read in conjunction with the accompanying drawings wherein.

DETAILED DESCRIPTION

Figure 1:
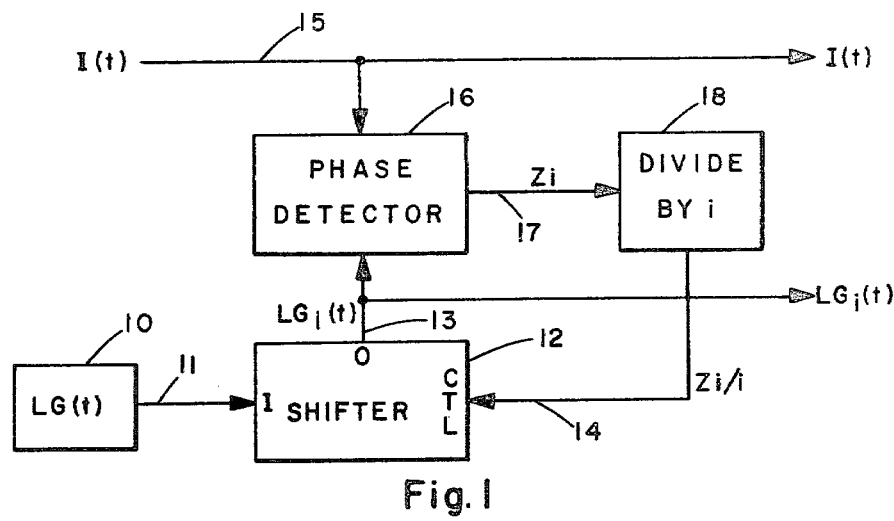
FIG. 1 is a block diagram of apparatus for producing a local generator signal in accordance with the invention.

Referring now to FIG. 1, a block diagram of apparatus which implements the improved method of synchronizing signals will be described. This apparatus includes a signal general 10 having an output 11 connected to an input of a shifter 12. In operation, generator 10 produces a signal LG(t) on lead 11, and shifter 12 produces a local generator signal $LG_i(t)$ on lead 13. Signal LG(t) consists of a plurality of nondistorted bits having one predetermined period. Signal $LG_i(t)$ is identical to LG(t) with the exception that it has a different phase. Its phase is controlled by the amount of delay through shifter 12; and this delay is selected by control signals on leads 14.

By controlling the amount of delay through shifter 12 in accordance with the disclosed method, the local generator signal on lead 13 is synchronized with an input signal I(t) on a lead 15. Signals I(t) consists of a plurality of bits which nominally are of the same one predetermined period as signals on lead] 13, but which are distorted therefrom. That is, the bits of signal I(t) are randomly stretched or shrinked from the nominal period.

In order to generate the control signals on Lead 14, signal I(t) and signal $LG_i(t)$ are connected via leads 13 and 15 to a phase detector 16. This phase detector operates to measure the phase difference between any two successive bits on leads 13 and 15. Detector 16 has an output 17; and signals $Z_i$ are generated thereon as indication of the measured phase differences.

Lead 17 connects to a divider circuit 18. This circuit generates control signals on leads 14 which change the phase of the signal $LG_i(t)$ by an amount proportional to the magnitude of the measured phase difference divided by the total number of phase measurements made. That is, the control signals on lead 14 change the phase of signals on lead 13 by an amount proportional to $Z_i$ divided by "i". This phase change is made in a direction which decreases the measured phase difference $Z_i$.

As a result, of this phase changing step, a new local generator signal is produced on lead 13. This new signal is operated on by phase detector 16 and divider circuit 18 in the same manner as described above. As a result, shifter 12 operates to again change the phase of the signal on lead 13. These phase measuring, dividing, and shifting steps are repeated multiple times. Each time the phase of the most recently produced new local generator signal is measured and shifted to produce the next new local generator signal.

Figure 2:
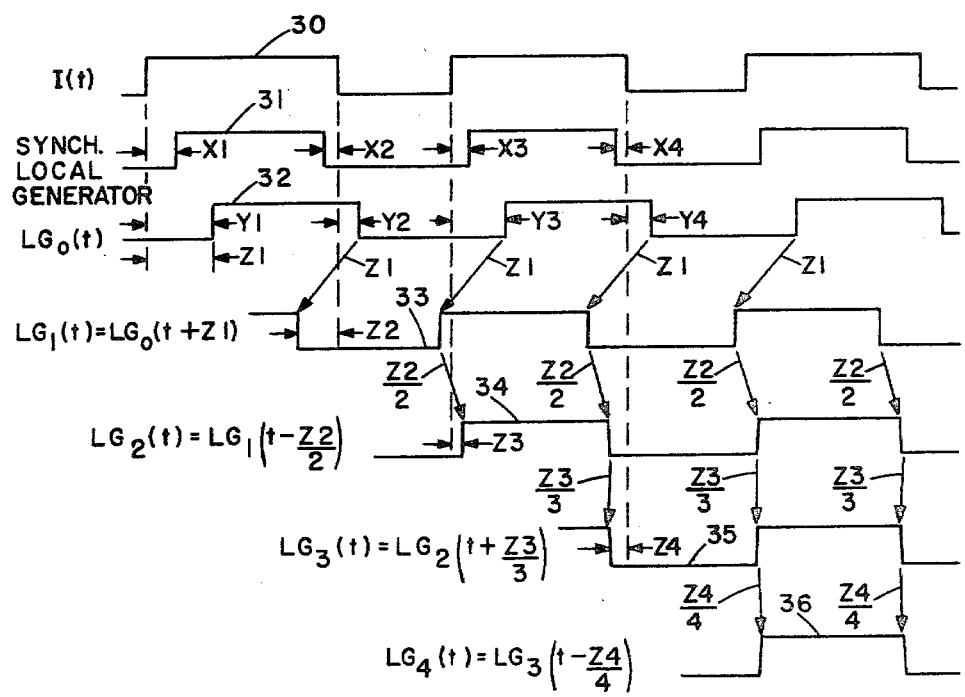
FIG. 2 is a timing diagram illustrating the operation and steps performed by the apparatus of FIG. 1.

The above described sequence of steps may better be understood by reference to the timing diagram of FIG. 2. In this Figure, a waveform 30 illustrates an exemplary portion of signal I(t). Also in this figure, a waveform 31 illustrates an ideally synchronized local generator signal. This signal is produced by the disclosed method and apparatus. Waveform 31 is characterized in that the phase differences X1, X2, . . . between it and corresponding bit of waveform 30 have an arithmatic sum which equals 0. These conditions must be met for perfect synchronization.

Also in FIG. 2, a waveform 32 represents the local generator signal $LG_i(t)$ (i=0) as it is initially produced. This signal has a phase which is arbitrary with respect to input signal I(t). One way to perfectly synchronize waveform 32 with waveform 30 is to measure all of the phase differences between the two waveforms; and to shift waveform 32 by the average of the phase differences. In other words, waveform 32 may be made identical to waveform 31 by first measuring the phase differences Y1, Y2, Y3, . . . by determining the average of these phase differences; and by shifting waveform 32 by this average amount. This approach however, is undesirable for the reasons previously stated in the background portion of the disclosure.

The remaining waveforms of FIG. 2 illustrate how waveform 32 is operated on by the disclosed method to become synchronized with signal I(t). As a first step, the phase difference Z1 between two successive bits of waveforms 30 and 32 are measured. Based on this phase difference, a new local generator signal $LG_i(t)$ (i=1) is formed as illustrated by waveform 33. That is, waveform 33 is formed by shifting waveform 32 in a direction which decreases the measured difference Z1 by the phase difference Z1 divided by 1.

Subsequently, a phase measurement is made between successive bits of waveforms 30 and 33. This phase measurement is indicated as Z2. Then the phase of waveform 33 is shifted in a direction which decreases the measured phase difference by an amount Z2 divided by 2. This produces another new local generator signal $LG_2(t)$ as illustrated by waveform 34.

Next, a phase measurement is made between successive bits of waveforms 34 and 30. This is illustrated in FIG. 2 as Z3. Then waveform 34 is shifted by an amount Z3 divided by 3 to produce still another new local generator signal $LG_3(t)$ as illustrated at 35. Subsequently a phase difference of Z4 is measured between successive bits of waveforms 35 and 30. Then the next new local generator signal is formed by shifting waveform 35 by an amount Z4 divided by 4. This produces another new local generator signal as illustrated by a waveform 36.

Figure 3A:
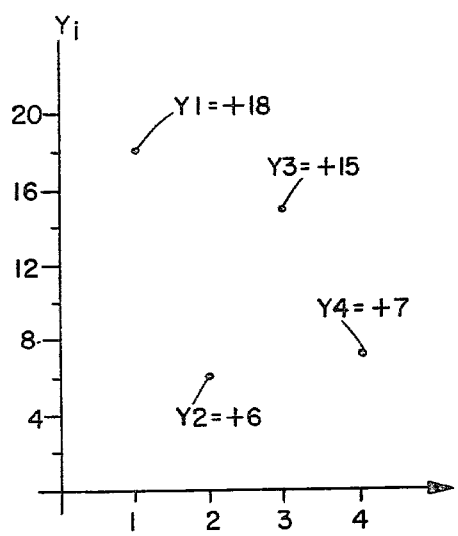
FIGS. 3a–3d are a set of graphs illustrating a numerical example of the synchronization steps of FIG. 2.

By repeating the above described phase measuring and phase changing steps multiple times, the new local generator signal $LG_i(t)$ is made identical to the ideally synchronized local generator signal of waveform 31. A numerical example of this fact is illustrated by FIGS. 3a–3d. In FIG. 3a, the phase differences Y1, Y2, are plotted as a set of points. The numbers used in this example correspond to the phase differences illustrated by the waveforms of FIG. 2.

Figure 3B:
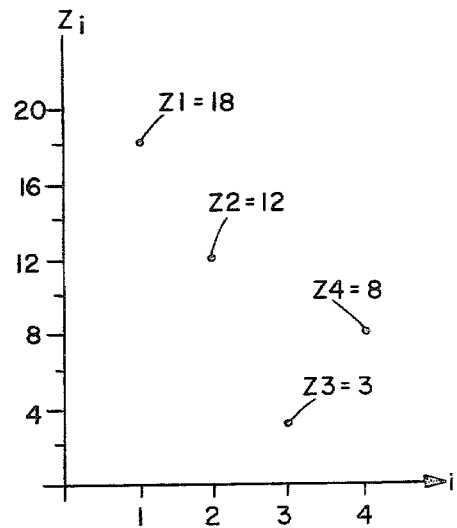

FIG. 3b in comparison, is a plot of the phase differences Z1, Z2, Z3, Z4, . . . . These points also correlate with the phase measurements of FIG. 3a and the waveforms of FIG. 2.

For example, the phase measurement Y1 of FIG. 3a equal 18 units; and therefore the phase measurements Z1 of FIG. 3b also equals 18 units.

Figure 3C:
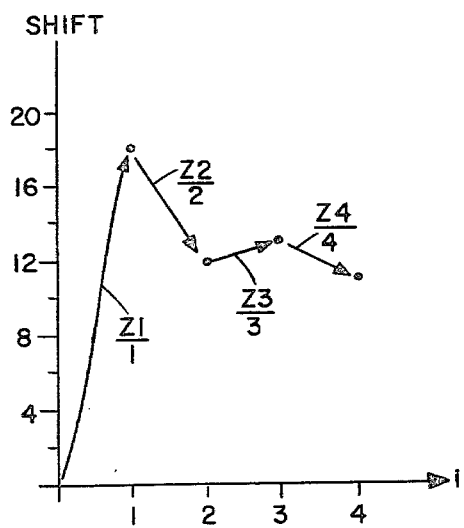

Since Z1 equals 18 units, the local generator signals is shifted by that amount as illustrated in FIG. 3c.

Subsequently to this shift, the phase measurement Z2 is made. Z2 equals Y2 minus Z1. In other words, Z2 equals 18 units minus 6 units or 12 units.

In response, the local generator signal is shifted in phase by an amount Z2 divided by 2 or 6 units. This is illustrated in FIG. 3c. The Z2 divided by 2 phase shift partially cancels the Z1 divided by 1 phase shift. As a result, there is a net phase shift of 12 units.

Subsequently, the phase measurement Z3 is made. Z3 equals Y3 minus Z1 plus Z2 divided by 2. In other words, Z3 equals 15 units minus 18 units, plus 6 units, or 3 units. Utilizing Z3 another new local generator signal is formed by shifting the previous local generator signal by an amount of Z3 divided by 3, or 1. This is illustrated in FIG. 3c. Next, another phase measurement Z4 is made. Thus, Z4 divided by 4 equals 2; and therefore, the new local generator signal is formed by shifting the previous local generator by two units as illustrated in FIG. 3c.

Figure 3D:
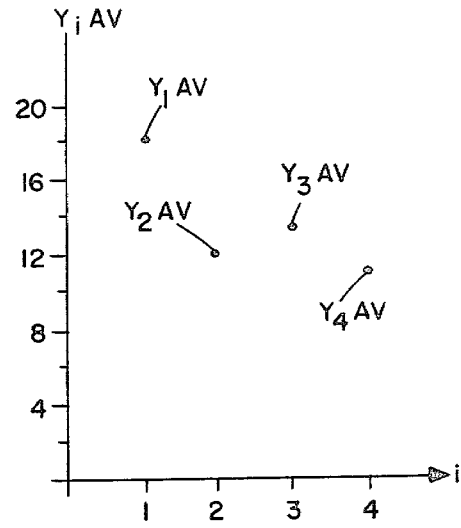

Referring now to FIG. 3d, there is illustrated a set of points representing the average of the phase measurement Y1, Y2, ... of FIG. 3a. For example Y2 average equals 18 plus 6 divided by 2, or 12. Similarly, Y3 average equals 18 plus 6 plus 15 divided by 3 or 13. Comparison of these averages with corresponding points in FIG. 3c shows that the net phase shift of the local generator signal is identical to the average of the Y phase measurements. For example, the net phase shift in the local generator signal $LG_i(t)$ after 2Z phase measurements were made equals 12 units. This is the same as Y2 average. Similaly, the net phase shift after 3z phase measurements were made equals 13, which is the same as Y3 average. Note however, that in calculating any one of the particular Y averages, it was necessary to recall all of the preceding Y phase measurements made. In comparison, in order to determine the Z shifts of FIG. 3c, only a single Z phase measurement is made and none of the preceding Z phase measurement need to be recalled.

Figure 4:
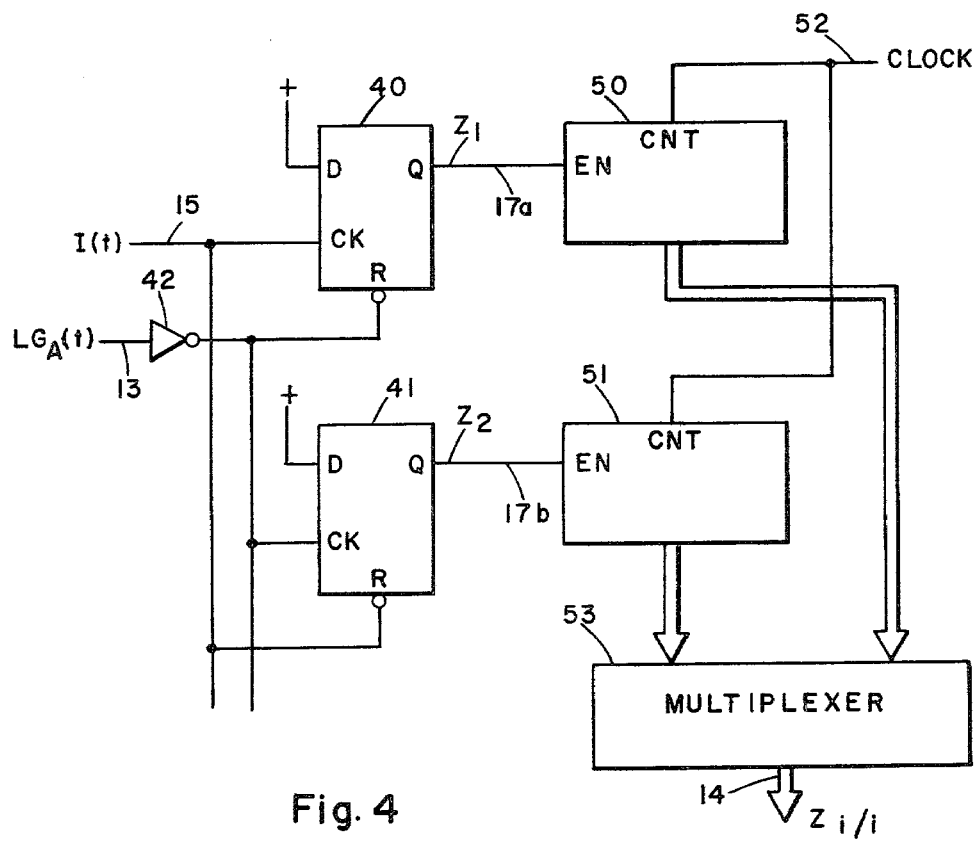
FIG. 4 is a detailed logic diagram of the portion of the FIG. 1 apparatus.
Figure 5:
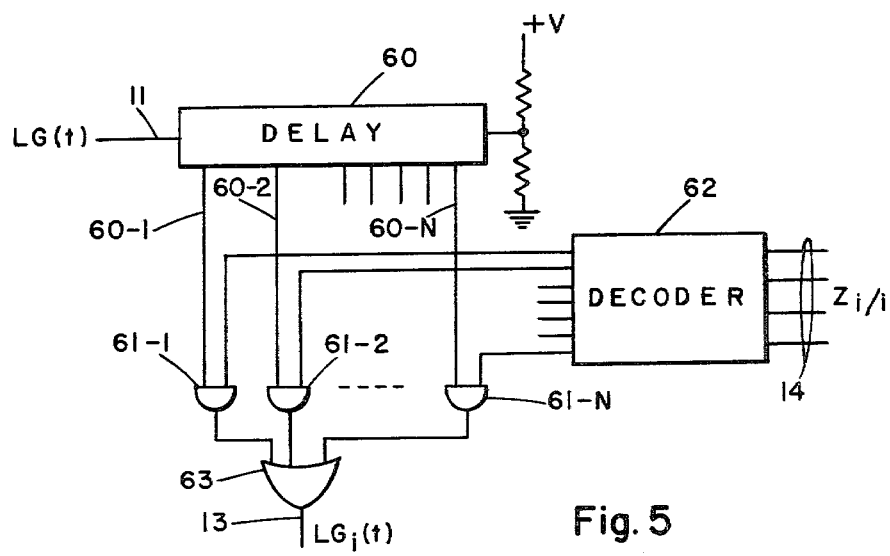
FIG. 5 is a detailed logic diagram of another portion of the FIG. 1 apparatus.

Circuits that are suitable for implementing phase detector 16, divider 18, and shifter 12, are illustrated in FIGS. 4 and 5. Phase detector 16 includes triggerable D flip-flops 40 and 41. A clocking input on flip-flop 40 is connected to receive input signal I(t) on lead 15; and a reset input on flip-flop 40 is coupled through an inverter 42 to receive the local generator signal on lead 13. Flip-flop 40 operates to detect phase differences which occur between a rising edge of signal I(t) and a subsequent rising edge of the local generator signal. In other words, it operates to detect phase differences such as Z1.

Similarly, flip-flop 41 has a clocking input coupled through inverter 42 to receive the local generator signal on lead 13; and a reset input coupled to receive input signal I(t) on the lead 15. In operation, flip-flop 41 measures phase differences that occur between the falling edge of the local generator signal and a corresponding falling edge of the input signal I(t). That is, it operates to measure phase differences such as Z2.

Leads 17a and 17b respectively connect the output of flip-flops 40 and 41 to enabling inputs in counters 50 and 51. These counters also having clocking inputs which are coupled to receive a clocking signal clock on a lead 52. This clocking signal is of a selectable frequency; and counters 50 and 51 generate counts proportional to this frequency times the pulse width of the signals on leads 17a and 17b respectively. Thus, by selectively setting the frequency of the clock signal to F1, F1/2, F1/3 ... the counts formed in counters 50 and 51 are representative of Z1, Z2/2, Z3/3 ...

Additional flip-flop and counter pairs are also included in circuits 16 and 18 to measure the phase differences which occur when the rising edge of signal I(t) occurs after the rising edge of $LG_i(t)$; or occur when the falling edge of $LG_i(t)$ occurs after the falling edge of I(t). These circuits are identical to those illustrated in FIG. 4 with the exception that signal I(t) is applied through the inverter to the reset input of flip-flop 40 and the clocking input of flip-flop 41; and signal $LG_i(t)$ is applied directly to the clocking input of flip-flop 40 and the reset of input of flip-flop 41.

The output of the counters such as 50 and 51 are selected through a multiplexor 53 to direct the operation of shifter 12 as described above. In one preferred embodiment shifter 12 includes a tapped delay line 60 as illustrated in FIG. 5. Delay line 60 has multiple outputs 60-1 through 60-N. They are connected to respective AND gates 61-1 through 61-N. These AND gates selectively pass one of the delay line output signals in response to signals from multiplexor 53. More specifically, a decoder 62 decodes to count Zi/i and this decode signal selects one output from delay line 60. The selected output passes through an OR gate 63 to lead 13 to thereby form the local generator signal $LG_i(t)$.

From the above discussion, it is apparent that the disclosed method may preferably be carries out by quantizing the amount of the various phase shifts made. This is done by the FIG. 5 circuit for example. There, the phase shifts are quantized in increments equal to the time delay between consecutive outputs of delay line 60.

Also from what has been described above, it is apparent that as the number of phase measurements increases, the amount of shift in the local generator signal tends to decrease. This is because the phase shift equal Zi divided by i, and i increases by one for each shift made. Therefore, the disclosed method may suitably be carried out by performing the phase measuring and phase changing steps only a predetermined number of times.

Various methods and apparatus for synchronizing a local generator signal with an input signal have now been described in detail. In addition, however, several changes and modifications can be made to the described details without departing from the nature and spirit of the invention. For example, while the waveform of the local generator signal in FIG. 2 was illustrated as an alternating one-zero-one-zero bit pattern, the disclosed method works equally well for synchronizing signals where the local generator signal is a non one-zero bit pattern. For example, if the input signal I(t) is of some predetermined bit pattern, the local generator signal preferably may also be of that same predetermined bit pattern. Therefore, since several changes and modifications can be made to the above described details without departing from the nature and spirit of the invention, it is to be understood that the invention is not limited to said details, but is defined by the appended claims.

I claim:

1. A method of synchronizing a local generator signal with an input signal wherein said local generator signal consists of a plurality of nondistorted bits having one predetermined period, and wherein said input signal consists of a plurality of bits which nominally are of said one predetermined period but which actually are distorted therefrom, said method including the steps of:

initially generating said local generator signal with a phase that is arbitrary with respect to said input signal;

measuring the phase difference between any two successive bits in said local generator signal and said input signal;

changing the phase of said local generator signal in a direction which decreases said measured difference by an amount proportional to said measured phase difference divided by the total number of phase measurements made to thereby produce a new local generator signal; and repeating said measuring step and said phase changing step multiple times, each time using the most recently produced new local generator signal as said local generator signal.

2. A method according to claim 1, wherein said phase changing step is performed by changing the phase of said local generator by a quantized amount proportional to said measured phase difference divided by the total number of phase measurements made.

3. A method according to claim 1, wherein said phase changing step is performed on the condition that said total number of phase measurements made is less than a predetermined limit.

4. A method according to claim 1, wherein said generating step is performed by generating said local generator signal with an alternating one-zero bit pattern.

5. A method according to claim 1, wherein said input signal is of a predetermined bit pattern, and wherein said generating step is performed by generating said local generator signal with the same predetermined pattern.

6. Apparatus for producing a local generator signal in synchronization with an input signal wherein said local generator signal consists of a plurality of non-distorted bits having one predetermined period, and wherein said input signal consists of a plurality of bits which nominally are of said one predetermined period but which actually are distorted therefrom, said apparatus including:

means for generating said local generator signal with a phase that is modifiable with respect to said input signal in response to control signals applied thereto;

means for measuring the phase difference between any two successive bits in the signal produced by said means for generating said input signal; and means for producing said control signals such that said means for generating modifies said phase of said local generator signal in a direction which decreases said measured difference by an amount proportional to said measured phase difference divided by the total number of phase measurements made.

7. Apparatus according to claim 6 wherein said means for generating includes a tapped delay line having a plurality of outputs, with said outputs being connected to respective logical AND gates for selection in response to said control signals.

8. Apparatus according to claim 7 wherein said means for measuring includes a plurality of triggerable flip-flop means for generating output signals having a pulse-width representative of said phase differences between successive bits, and wherein said means for producing said control signals includes counting means coupled to receive said output signals for generating counts representative of said pulsewidths times selectable frequencies F1, F1/2, F1/3 F1/4 . . . .

* * * * *